US006971535B2

United States Patent
Weiss et al.

(12) 
(10) Patent No.: US 6,971,535 B2
(45) Date of Patent: Dec. 6, 2005

(54) CONTAINMENT VESSEL

(76) Inventors: Peter Weiss, 300 E. 34th St., Apt. 24D, New York, NY (US) 10016; Joel Haas, 114 Olympus Cir., Jupiter, FL (US) 33477

( * ) Notice: Subject to any disclaimer, the term of this patent is extended or adjusted under 35 U.S.C. 154(b) by 0 days.

(21) Appl. No.: 09/860,957

(22) Filed: May 17, 2001

(65) Prior Publication Data

US 2002/0170910 A1  Nov. 21, 2002

(51) Int. Cl.[7] .............................................. B65D 6/16
(52) U.S. Cl. ...................... 220/489; 220/485; 220/491; 220/4.16; 220/919; 277/651; 277/652; 277/906
(58) Field of Search ................................ 220/485, 491, 220/6, 7, 4.16, 919, 918, 489; 383/104; 277/650, 277/651, 652, 910, 906; 119/245, 269

(56) References Cited

U.S. PATENT DOCUMENTS 3,651,975 A * 3/1972 Callan .......................... 119/269
3,964,628 A * 6/1976 Wilson ......................... 206/513
4,231,322 A * 11/1980 Gilpatric ...................... 119/237
5,680,948 A * 10/1997 Schmidt et al. ................. 220/7
5,788,378 A * 8/1998 Thomas ....................... 383/104
6,170,685 B1 * 1/2001 Currier ........................ 220/3.2

* cited by examiner

Primary Examiner—Stephen Castellano
(74) Attorney, Agent, or Firm—McHale & Slavin, P.A.

(57) ABSTRACT

A containment vessel formed from at least two rigid panels placed in a parallel plane having a spacer positioned between the panels wherein a containment area is formed along an upper surface of the spacer and inner surface of the rigid panels. The spacer can be formed into any shape with a distal end and proximal end of the spacer forming an inlet to the containment area. The containment vessel employs a reusable securement fastener allowing for the disassembly of the panels and replacement or reshaping of the spacer to form different shaped containment areas. The containment vessel can be pre-shaped or fixed.

14 Claims, 4 Drawing Sheets

CONTAINMENT VESSEL

FIELD OF THE INVENTION

This invention relates to vessels and more particularly to a reusable containment vessel that can be assembled or fixed to meet a desired containment area by the use of a spacer formed into various shapes providing a containment vessel having both functional and decorative uses.

BACKGROUND OF THE INVENTION

The use of containment vessels is well-known. A conventional containment vessel may be defined as a fish tank, perfume bottle, vase, mason jar, bucket, salt/pepper holder or nearly any other apparatus capable of retaining either liquids or solids.

When a containment vessel is used for decorative purposes, a decorator may choose to have a room theme having similar elements. For instance, if a decorator desired a modern look, the decorator would have to search for items that met this theme including containment vessels. Should a decorator choose to change the theme of a room, a decorator may have to search out items that met the new decor and if the previously used containment vessels did not meet the new theme, the vessels may need to be exchanged for vessels that met the current theme. Due to the expense and associated waste of disposing of previously used vessels, the theme may not be changed in its entirety or with the flexibility that can be obtained by the use of a universal vessel. Thus, one problem with the prior art is the lack flexibility when a vessel is purchased that is limited in function or decorative use. For these reasons, it has been discovered that instances exist where a containment vessel that can be reshaped or sized to fit a particular need is of value.

Still another short coming of the prior art is the inability to coordinate multiple containment vessels. For instance, the ability to find a fish tank and a flower vase that is similar would require the manufacturers to be the same, or pure coincidence. Matching of a salt/pepper vessel to a salad dressing vessel is most difficult.

The prior art lacks the ability to disassemble a vessel and reform the containment area, or interchange the component parts to make unique shapes/sizes.

Thus, what is lacking in the art is a containment vessel that can be formed to meet the needs of the individual and include the ability to be re-worked into any new or different shape as the individual desires.

SUMMARY OF THE INVENTION

This invention is directed to a containment vessel that allows the formation of a containment area by the use of a flexible spacer placed between two rigid panels. The spacer can be made out of any material that has the ability to create a seal. For instance, a spacer may consist of a flexible wire wherein the wire is bent into a particular shape and when placed between two panels. The wire retains a shape and the coating on the outside of the wire forms a seal to prevent leakage. A containment area used to hold salt, pepper, or any other spice needs only a seal capable of prevent the grains of the material from escaping. Alternatively, the seal maybe of a type to prevent a liquid from passing such as water if the vessel is used to hold salad dressing. Further, no sealing ability is need when a vessel is used to hold large solids such as flowers, photographs, packing tape, and so forth.

A containment vessel used functionally may include a cap to prevent loss of materials placed within the containment area. The rigid panels maybe transparent, translucent, colored, an of any shape as long as the inner surface of each panel remains parallel to opposing surfaces.

The containment vessel is based upon a first panel formed from a sheet of rigid material, a second panel formed from a sheet of rigid material, and a spacer positionable between the first and second panels. The spacer has rigidity along at least one plane and is maintained in position by a securement means such as a fastener for maintaining the first and second panels in a parallel juxtaposition with the spacer maintained in a fixed position. The placement of the spacer means between the first and second panels creates at least one containment area wherein material placed within the containment area is held by the inner surface of each panel and an upper surface formed by the flexible spacer.

A unique aspect of this invention is the ability to capture the spacer in a free floating position. Thus, if the containment vessel is handled improperly causing the panels to shift, the free floating spacer will move but retain a seal. For instance, should a conventional fish tank be subjected to an improper movement, such as that caused by an earthquake, the rigidity of the fish tank may not handle the movement and cause leakage or a catastrophic failure. This instant invention would accommodate such movement to prevent such a failure.

An objective of the present invention to disclose a containment vessel that is assembled by the use of two planer panels with a spacer placed there between.

It is another objective of the present invention to disclose the use of a containment area that can be formed into various shapes by use of a flexible spacer held in a fixed position between the two planer panels.

Yet still another objective of the present invention is to disclose a reusable container assembly that can be disassembled allowing a flexible spacer to be formed into various shapes to form different sized containment areas.

Still another objective of the present invention is to disclose a containment vessel that can be used as a display vessel having at least one transparent panel for viewing of materials placed within the containment area.

Still another objective of the present invention is to disclose a containment vessel having panels made of transparent or various degrees of transparency including the use of colored or painted panels.

Another objective of the present invention is to disclose a containment vessel that can be formed into various shapes for decorative purposes wherein the shape of the spacer, panels, color of panels, and/or materials placed within the containment vessel provide an unlimited range of decorative vessels or artwork.

Yet still another objective of the present invention is to disclose a containment vessel that can be disassembled for cleaning.

Another objective of the present invention is to disclose a containment vessel that can be disassembled for replacement of parts to allow use with large solids, small solids, liquids, or any combination thereof.

Another objective of the present invention is to disclose a containment vessel having a top to form an air tight containment area.

Still another objective of the present invention is to disclose a containment vessel that can be moved, such as an earthquake movement, wherein the sealing mechanism allows movement without leakage.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

While this invention will be described in terms of specific embodiments, it will be readily apparent to those skilled in this art that various modifications, rearrangements and substitutions can be made without departing from the spirit of this invention. The scope of this invention is defined by the claims appended hereto.

Figure 2:
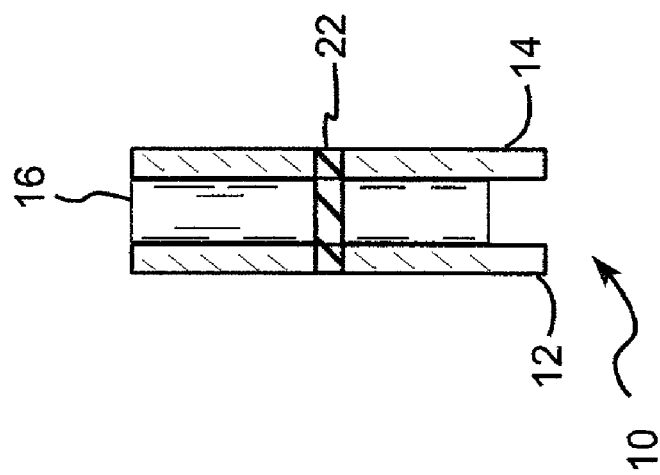
FIG. 2 is a side view of FIG. 1.
Figure 1:
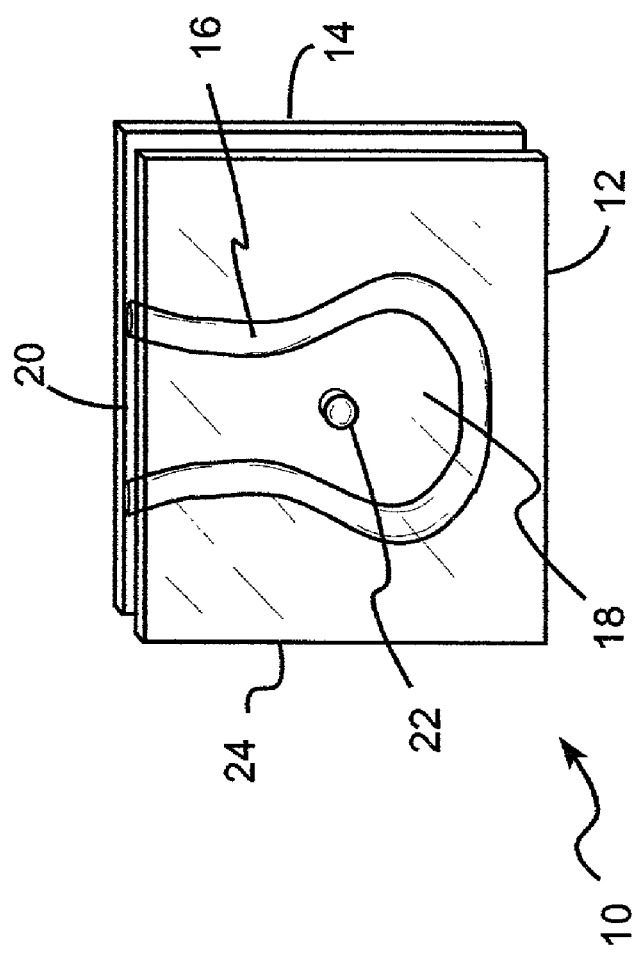
FIG. 1 is a perspective view of a containment vessel having single fastener for securement of panels.
Figure 3:
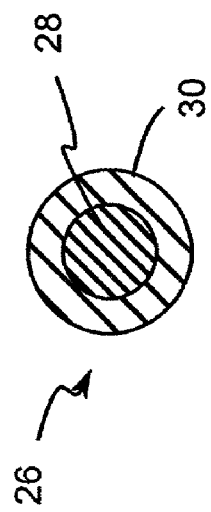
FIG. 3 is an end view of a wire spacer.

Referring now to FIGS. 1 and 2, set forth is the containment vessel in the first embodiment. A first panel 12 is formed from a ridged piece of material such as glass, acrylic, or any other ridged flat plastic which is spaced apart from a second panel 14 of similar rigidity by use of a spacer 16. The spacer 16 is formed from a flexible and/or bendable material that is sandwiched between the first panel 12 and the second panel 14 wherein an upper surface of the spacer 16 operates in conjunction with the panels 12,14 to form a containment area 18 having an opening 20. The panels 12,14 can be made of a transparent, translucent, or colored material depending upon the particular usage. For instance, a containment vessel could be formed into the shape of a fish tank wherein each panel could be formed from a clear rigid plastic such as acrylic thereby allowing the assembly of a fish tank upon demand and formed to a particular size as defined by the amount fish purchased, as well as the size of the fish. In this embodiment, panels 12 and 14 are held together by the use of a single fastening bolt 22 placed through the middle of the assembly. Alternatively, multiple fastening bolts or U-shaped brackets, as described later in this specification, may be used if the interior of the containment vessel is not to be compromised. The outer edge 24 of the panel 12 maybe circular, oval, jagged, square. The second panel 14 may be identical to the first, or of a dissimilar shape as long as inner surface of the panel has sufficient area to accommodate the spacer and is of an equal surface plane to allow sealing. Further, panels 12 and 14 can be of dissimilar color or various transparencies so as to provide multi dimensional defects when viewing the containment area from different directions. FIG. 3 depicts one type of spacer which may consist of a wire 26 having a metal core 28 and a coating or insulation area 30 surrounding the metal core 28. The metal core 28 provides the ability to form the wire into any type of shape and the coating 30 provides the sealing mechanism necessary for placement between the panels.

Figure 4:
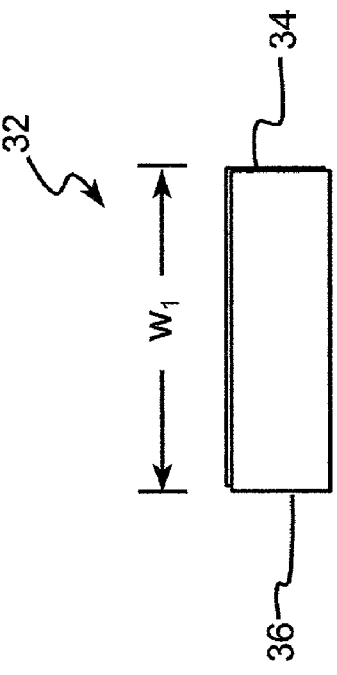
FIG. 4 is an end view of a flat spacer.

FIG. 4 depicts a wider spacer 32 having a width w1 which can be used to position the panels further apart. The spacer 32 may be formed of a flexible and bendable material such as PVC plastic. The plastic will bend along its length but not its width. In this manner, placement of the spacer 32 positions the panels in the preferred spaced apart position with each side edge 34 and 36 of deformable material so as to provide sealing to the containment vessel. Further, 32 may be formed or other types of flexible flat material including rubber, polypropylene, polypropylene and so forth. The variable size spacers allow the containment vessel to be used as a container set for dry goods, kitchen utensils, salt and pepper shakers, crulette sets containing oil and vinegar in one vessel, decorative fillable perfume bottles, fish tanks, decanters, vase, floating candle stands, picture frames, cookie jars, sand hour glass, pen/pencil holder, tape dispenser, stamp dispenser, toy and block building set, and so forth.

Figure 5:
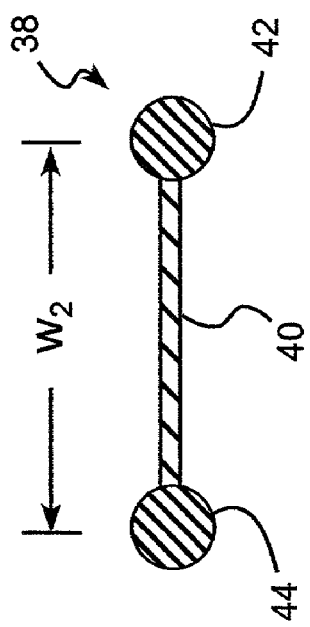
FIG. 5 is an end view of a flat spacer with edge grommets.

FIG. 5 depicts yet another spacer embodiment 38 consisting of a flat spacer material 40 having a width w2 with a grommet 42 and 44 placed on each end of spacer 40. For instance, the spacer material 40 may consist of a thin metal strip of steel or rigid plastic which has no deformity along the width and thus does not allow for sealing. The seals 42 and 44 maybe placed on each side of the strip 40 wherein seals 42 and 44 provide the sealing mechanism to prevent material from going around the spacer 40 as it is placed between the first and second panel.

By way of example a four foot by three foot fish tank having five inches between the panels could contain approximately forty gallons of water if a two inch spacer bar having approximately eleven feet of inner surface was employed.

Figure 7:
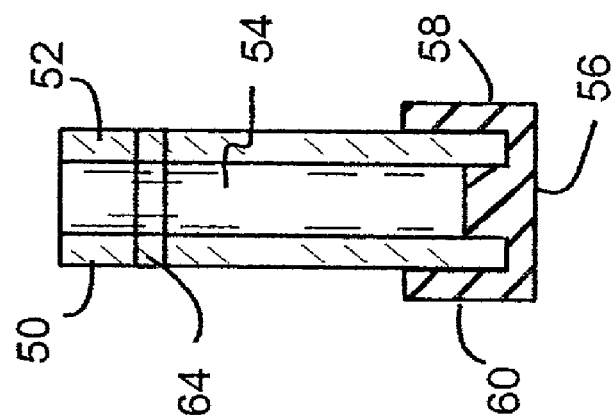
FIG. 7 is a side view of FIG. 6.
Figure 6:
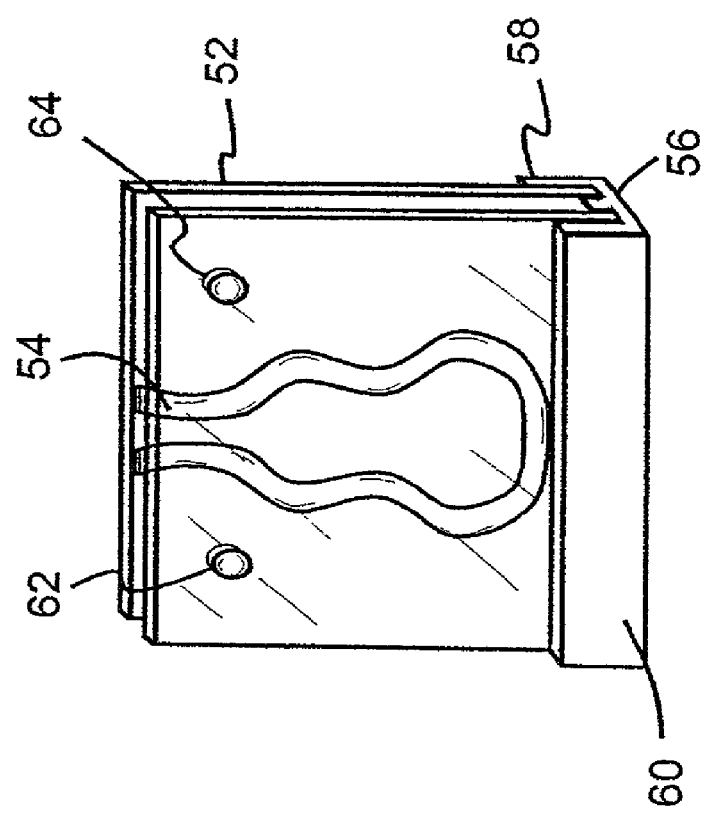
FIG. 6 is a perspective view of a containment vessel having a double fastener and base plate support for securement of panels.

Referring now to FIGS. 6 and 7 set forth is a second embodiment of the invention which includes the basis of the first embodiment namely a first panel 50 and a second panel 52 spaced apart by spacer 54. In this embodiment a base 56 is formed in a W-shape which further operates as an assistance to the holding of the panels by having side walls 58 and 60 which will operate in conjunction with fastening bolts 62 and 64 so as to maintain the panels 50 and 52 in a parallel spaced apart position. In this embodiment the fastening bolts 62 and 64 need not be centrally located or otherwise interfere with the containment area and thus form a fixed spacer which provides a uniform support base for containment of larger amounts or weight of material such as large fish tanks. Various inverted bracket embodiments include the use of a bracket formed in a U-shape, V-shape, W-shape, or any other shape capable of capturing at least two panels in a side by side position.

The use of three panels allow for a unique depth perception. For instance the positioning of the first two panels could be used a fish tank while a third panel, juxtapositioned to a middle panel wherein an ocean scene may be placed. The ocean scene can be modified without affecting the fish tank.

Figure 8:
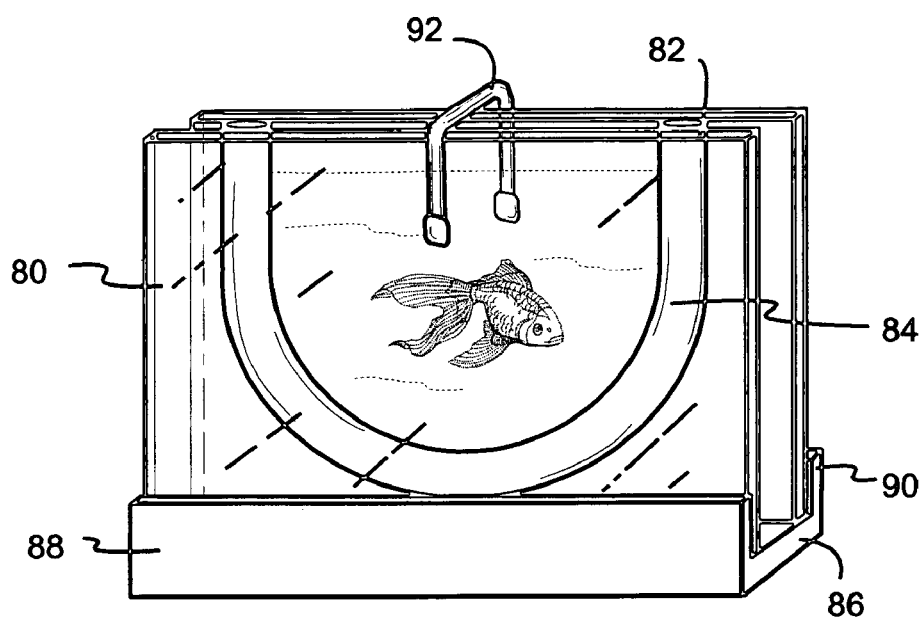
FIG. 8 is a perspective view of a containment vessel having a inverted U-shaped fastener and base plate support for securement of panels.
Figure 9:
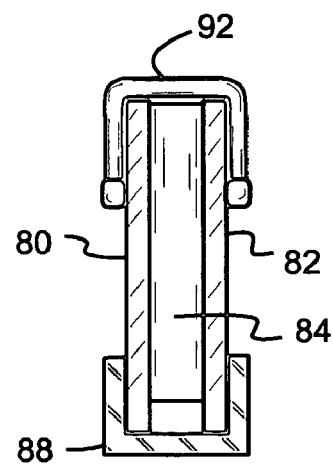
FIG. 9 is a side view of FIG. 8.

Referring now to FIGS. 8 and 9 set forth is yet another embodiment of the invention which includes the basis of the first embodiment namely a first panel 80 and a second panel 82 spaced apart by a spacer 84. In this embodiment a base 86 operates as a fastener by having side walls 88 and 90 which will operate in conjunction with inverted U-shape bracket 92 so as to maintain the panels 80 and 82 in a parallel spaced apart position with the spacer 90 sandwiched therebetween. The spacer 90 serves as a bias point to urge the bottom edges of the panels 80, 82 against the inner surface of the base 86. The containment vessel of this embodiment can be assembled and disassembled without the use of tools.

The embodiments described above can be made from one or more panels wherein each panel can form a mirror image of another panel or be of dissimilar shape, size, material. Further the containment vessel can be made to appear multidimensional wherein one or more panels are transparent, translucent or of various degrees of transparency including coloring of the panel.

From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

What is claimed is:

1. A containment vessel having an internal cavity which can be selectively variably shaped comprising opposed first and second rigid planar panels, said first and second panels forming opposite inner surfaces, a flexible wire having first and second ends sandwiched between said first and second panels and contacting said opposite inner surfaces, said flexible wire selectively positionable into variable shapes and including a metal core with a coating thereon adapted for sealing engagement with said panels, said first and second ends of said flexible wire positioned proximate said top edges of said first and second panels in a spaced apart arrangement to provide an accessible containment area defined by said flexible wire thereby forming an internal cavity adapted to be varied by changing said shape of said flexible wire, said internal cavity adapted to contain liquids and solids, and means to secure said top edges of said first and second panels to one another in a spaced apart parallel position whereby said flexible wire is held in position between said panels.

2. A containment vessel capable of repeated disassembly and assembly with a variable shaped containment area comprising a first planar rigid panel, said first panel having a top edge, a bottom edge and longitudinal side edges connecting said top edge and said bottom edge, a second planar rigid panel, said second panel having a top edge, a bottom edge and longitudinal side edges connecting said top edge and said bottom edge, an elongated flexible wire having first and second ends and being selectively manually shapable wherein said flexible wire can be shaped into at least a first shape contacting said first panel and said second panel intermediate said top edge, said bottom edge and said longitudinal side edges of said first panel and said second panel, a securement means for maintaining said first and second panels in juxtaposition and sealing said wire between said first and said second side panels forming a cavity wherein said flexible wire bent into said first shape and said first and second ends of said wire are positioned proximate said top edges of said first and second panels in a spaced apart arrangement to define an opening to provide access to said cavity whereby said first shape of said flexible wire defines a first shape of said cavity forming the containment area.

3. A containment vessel of claim 2 wherein said containment vessel is disassembled and assembled, and said flexible wire can be selectively shaped into a second shape whereby said second shape of said wire defines a second shape of said cavity forming the containment area.

4. A containment vessel having a cavity for containing liquids and solids, said vessel comprising a first panel, a second panel, a base, an elongated flexible wire having first and second ends wherein said flexible wire is selectively manually shapable, and a bracket, and, said first and said second panel each having an outer surface, said base including parallel spaced apart first and second side walls, said outer surface of said first and said second panel each contacting said first and second side walls, respectively, said wire intermediate said first and said second panel, said bracket engaging said outer surfaces of said panels to seal said wire intermediate said panels to define a cavity wherein said first and second ends of said wire are positioned proximate said top edges of said first and second panels in a spaced apart arrangement to define an opening to provide access to said cavity, and said wire biases said outer surface of said panels against said bracket and said wire operates as a bias point in cooperation with said bracket to urge said first and said second panels against said first and second side walls whereby the shape of said wire defines the shape of said cavity.

5. A containment vessel of claim 4, wherein said flexible wire comprises a metal core with a coating thereon adapted for sealing engagement with said first and second panels.

6. A containment vessel, comprising:
   first and second rigid planar panels of approximately equal dimensions each having a top edge, a linear bottom edge having a length and longitudinal side edges, said first and second rigid planar panels each having an inner surface and an outer surface;
   a base adapted to receive said first and second rigid panels formed as a U-shaped channel having a bottom wall and opposing vertical side walls, said base having a length approximately equal to said length of said linear bottom edges wherein said linear bottom edges of said first and second panels are positioned in said base to be seated respectively adjacent said opposing side walls such that said first and second panels are parallel with one another;
   an elongated flexible wire having a width and first and second ends; said flexible wire being selectively manually positionable into variable shapes wherein said the width of said flexible wire allows said flexible wire to be sandwiched between said first and second panels with said panels seated in said base such that said flexible wire is juxtaposed with said inner surfaces, said first and second ends of said flexible wire positioned proximate said top edges of said first and second panels in a spaced apart arrangement to provide an accessible containment area defined by said flexible wire; and
   means to secure said top edges of said first and second panels to one another in a spaced apart parallel arrangement whereby said flexible wire is held in position and said wire serves as a bias point to urge said bottom edges against said vertical walls of said base.

7. A containment vessel of claim 6, wherein said flexible wire comprises a metal core with a coating thereon adapted for sealing engagement with said first and second panels.

8. The containment vessel of claim 6, wherein said biasing means is a U-shaped bracket which engages the outer surfaces of the first and second panels.

9. The containment vessel of claim 6, wherein at least one of said first and second panels is transparent.

10. The containment vessel of claim 6, wherein at least one of said first and second panels is translucent.

11. The containment vessel of claim 6, wherein at least one of said first and second panels is constructed from glass.

12. The containment vessel of claim 6, wherein at least one of said first and second panels is constructed from plastic.

13. The containment vessel of claim 6, wherein said flexible wire is positioned to approximate the external shape of a conventional vessel whereby spacing of said first and second ends provides an opening to the vessel.

14. The containment vessel of claim 6, wherein said U-shaped bracket can be selectively manually removed, whereby said containment vessel can be disassembled.

* * * * *